United States Patent Office 2,965,201
Patented Dec. 20, 1960

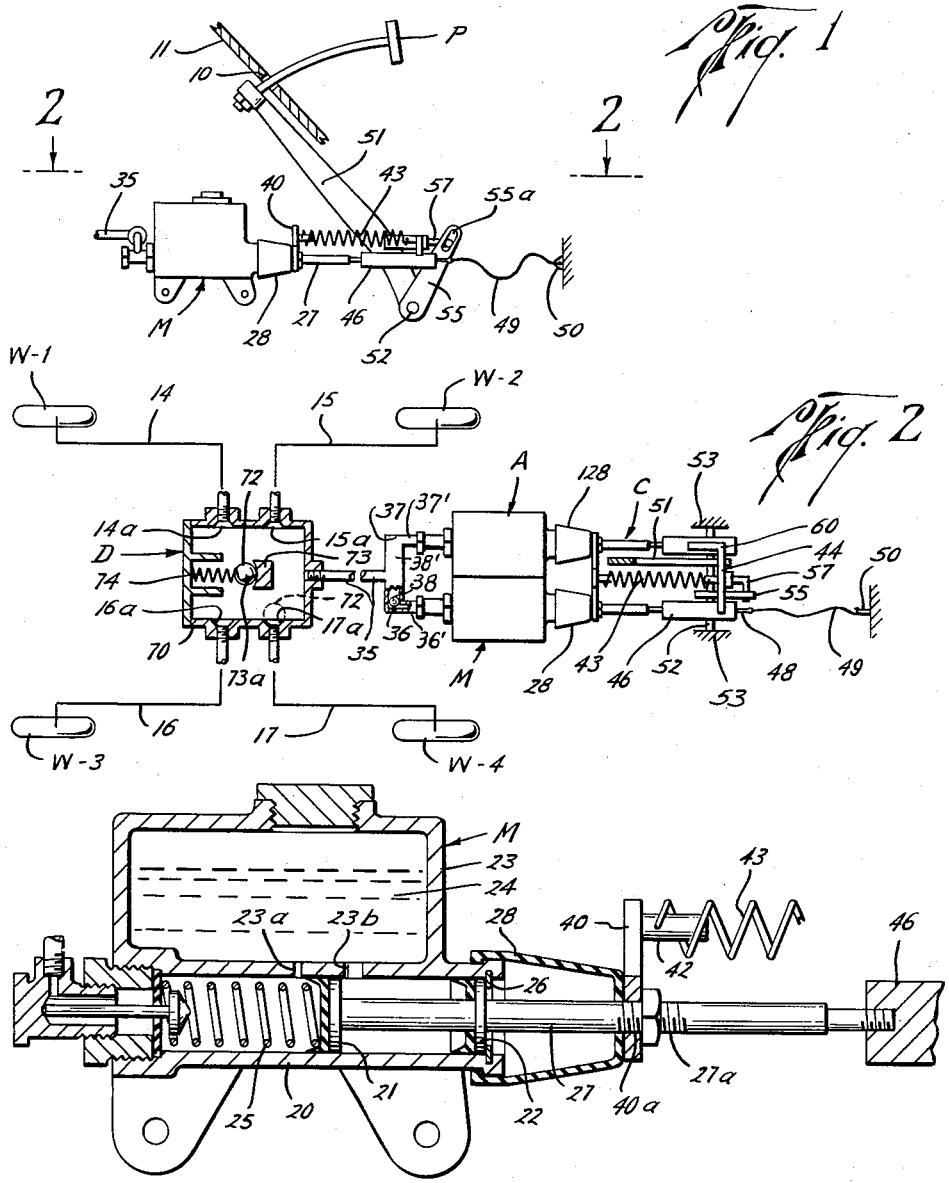

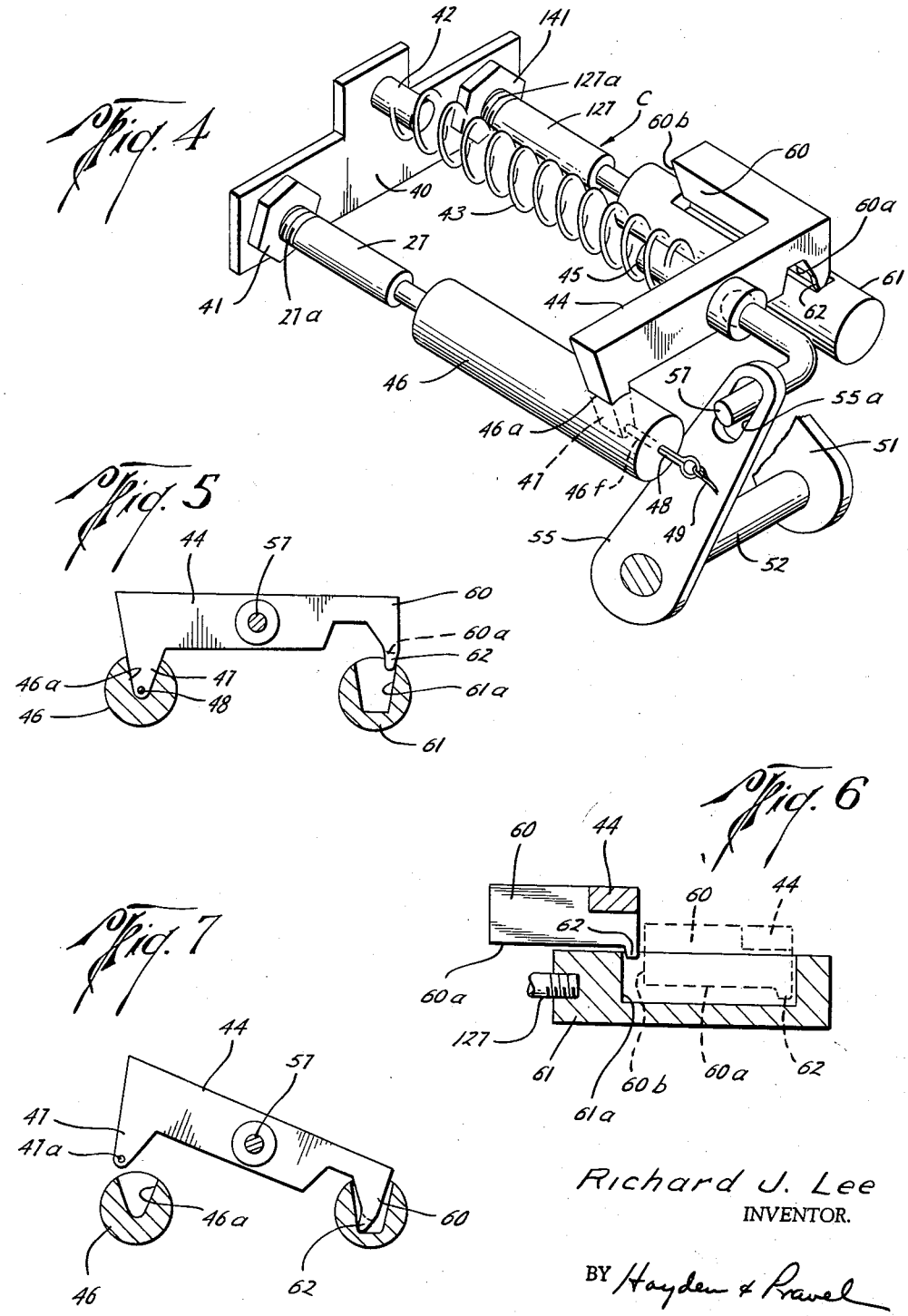

2,965,201

SAFETY BRAKE APPARATUS

Richard J. Lee, 2205 Galveston Road, Houston, Tex.

Filed July 2, 1958, Ser. No. 746,206

4 Claims. (Cl. 188—151)

This invention relates to brake apparatus.

An object of this invention is to provide a new and improved brake apparatus for use in emergencies as safety equipment to stop an automobile or other vehicle when the conventional brake system on the automobile or other vehicle fails to operate.

An important object of this invention is to provide a new and improved brake apparatus which is adapted to be automatically actuated by the driver of a vehicle to stop the vehicle in the event the conventional brake system does not perform to stop the vehicle.

Another object of this invention is to provide a new and improved safety brake apparatus which is normally inactive but which is rendered operative by the operation of the brake pedal of a vehicle if the main brake system fails to function to stop or retard the movement of the vehicle, whereby the danger from failure of the main brake system to operate is obviated.

A further object of this invention is to provide a new and improved fluid operated or hydraulic brake apparatus in which means are provided for automatically closing the flow of hydraulic fluid to any brake line leading from the master cylinder to a wheel cylinder in which a leak develops, whereby the brakes are still effective for the other wheels.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is an elevation of the preferred form of the apparatus of this invention;

Fig. 2 is a view taken on line 2—2 of Fig. 1, and it further illustrates the preferred form of the apparatus of this invention;

Fig. 3 is a view, partly in elevation and partly in section, illustrating the internal construction of one type of master brake cylinder used with the apparatus of this invention;

Fig. 4 is an isometric view of the portion of the apparatus of Figs. 1 and 2 which is used for changing from the main master brake cylinder when it becomes defective to an auxiliary master brake cylinder;

Fig. 5 is a view, partly in elevation and partly in section, illustrating a portion of the mechanism shown in Fig. 4;

Fig. 6 is a view of a portion of the apparatus or mechanism shown in Fig. 4 which illustrates the relative positions of several of the parts therein; and Fig. 7 is a view similar to Fig. 5, but illustrating that portion of the apparatus shown therein when the parts are in the position for operating the auxiliary master cylinder instead of the main master cylinder.

In the drawings, the letter M designates generally the main master brake cylinder of a conventional fluid operated or hydraulic brake system for an automobile or other vehicle. In the preferred form of the invention, the master cylinder M is operated in a known manner by a foot pedal P which extends through a suitable opening 10 in a floor board 11 of a vehicle. The master cylinder M is connected with wheel brake cylinders W–1, W–2, W–3, and W–4 which are of conventional construction and which are schematically illustrated in Fig. 2 of the drawings. In accordance with this invention, an auxiliary master brake cylinder A is also mounted with the automobile or other vehicle so that if the main master cylinder M fails to operate to stop the vehicle, the auxiliary master cylinder A may be used in the brake system in place of the main master cylinder M. A changing means C which also forms a part of this invention is provided so that when the main master cylinder M fails to operate, such main master cylinder M is disconnected from the pedal P and the auxiliary master cylinder A is connected with the pedal P by a manipulation of the pedal P, as will be fully explained hereinafter. A further feature of the invention is a mechanism D which is provided for cutting off or closing fluid communication to any of the fluid conductors 14, 15, 16 or 17 in the event a leak develops in any of such fluid conductors or in the wheel brake cylinders W–1, W–2, W–3, or W–4 therewith. Therefore, regardless of the location of the failure in the conventional brake system, the safety apparatus of this invention enables the driver of the vehicle to stop the movement of the vehicle, and such stopping of the vehicle is accomplished by merely manipulating the pedal P so that even the most inexperienced driver can easily stop the vehicle with the safety apparatus of this invention.

Considering the invention in detail, the main master cylinder M and the auxiliary master cylinder A are of any conventional construction, and preferably they are identical. One type of construction is illustrated for the main master cylinder M in Fig. 3, wherein the cylinder 20 is shown with a double piston 21, 22 mounted therein for developing a fluid pressure in the brake system. A chamber 23 is provided for holding a reserve quantity of the brake fluid indicated with the numeral 24. Ports 23a and 23b establish fluid communication from the chamber 23 to the cylinder 20 for the pistons 21, 22. A coil spring 25 or other resilient means is used to urge the pistons 21, 22 to a position in which substantially no fluid pressure remains in the brake system which would of course be a non-braking position. The pistons 21, 22 are limited in movement to the right (as viewed in Fig. 3) by reason of a snap ring 26 or any other suitable stop means. A piston shaft 27 is formed integrally with the pistons 21, 22 or is otherwise connected thereto, and such piston shaft 27 extends externally of the cylinder 20 for connection with the pedal P, as will be explained in detail hereinafter. A flexible cover 28 is mounted around the portion of the shaft 27 which moves into and out of the cylinder 20 during the reciprocation of the pistons 21, 22 in the cylinder 20.

As previously mentioned, the auxiliary master cylinder A is preferably formed of the same parts and construction as the main master cylinder M. The main master cylinder M and the auxiliary master cylinder A are both connected to a common fluid conductor 35 which leads to the mechanism D and then to the fluid conductors 14, 15, 16, and 17 for each of the wheel brake cylinders W–1, W–2, W–3 and W–4. A two-way check valve having valve seats 36, 37 and a ball valve 38 may be provided between the cylinder M and the cylinder A, respectively, and the fluid conductor 35, but it will be appreciated by those skilled in the art that the fluid must flow back and forth from the wheel cylinders W–1, W–2, W–3 and W-4 to either the master cylinder M or the auxiliary cylinder A, depending upon which one is in use. It is to be noted that the ball 38 may move back and forth through tube 38′ to seat on either the valve seat 36 or 37. The ball 38 is retained in the tube 38′ by any suitable means such as by making the tube 38′ of a larger diameter than the tubes 35, 36′, and 37′. When the master cylinder M is in use, the ball 38 is positioned at valve seat 37 to close fluid flow to the cylinder A but permitting fluid flow between the cylinder M and the wheel cylinders. When the auxiliary cylinder A is in use, the ball 38 is positioned at the valve seat 36 to close flow to the cylinder M while permitting fluid flow between the cylinder A and the wheel cylinders.

The changing means C for changing from the operation of the main master brake cylinder M to the auxiliary master brake cylinder A is shown in detail in Figs. 4-7. Such means C includes a connecting plate 40 which is formed wih an opening 40a (Fig. 3) through which the shaft 27 extends. A similar opening (not visible) is provided in the connecting plate 40 through which the shaft 127 of the auxiliary master cylinder piston extends. Nuts 41 and 141 are threaded on a threaded portion 27a and 127a of the shafts 27 and 127, respectively to position the connecting plate 40 in contact with the covers or cups 28 and 128. The connecting plate 40 has a dowel pin 42 secured thereto, and one end of a torsion spring 43 is connected to such dowel pin 42.

A rocker arm 44 having a dowel pin 45 secured thereto is positioned at the opposite end of the torsion spring 43, and the spring 43 is connected to the pin 45 for applying a torsion force to the rocker arm 44 in a direction to rotate the rocker arm 44 in a clockwise direction as viewed from the right hand end of Fig. 4 of the drawings. A connecting bar or rod 46 is threaded or is otherwise connected to the piston shaft 27 (Figs. 3 and 4). The bar or rod 46 has a recess 46a formed therein for receiving a lug 47 on the rocker arm 44. Although the torsion spring 43 acts on the rocker arm 44 to apply a force which would normally tend to move the lug 47 out of the recess 46a, the lug 47 is held in the recess 46a during normal operation of the master cylinder M by means of a locking pin 48 which may be a cotter pin or any other similar type of locking member. Such locking pin 48 extends through an opening 46f which extends longitudinally in the bar or rod 46 from the outer end thereof to the recess 46a. The locking pin 48 is connected to a wire 49 (Figs. 1, 2 and 4) which has its other end secured to a fixed part of the chassis 50 of the vehicle. The wire or other flexible line 49 is normally slack and is therefore inactive, but it is of a predetermined length such that when the pistons 21, 22 in the main master cylinder M move a greater distance than their normal stroke, the line 49 becomes taut and ultimately holds the pin 48 as the bar 46 moves relative thereto for pulling the pin 48 from the bar 46.

During the normal stroke of the pistons 21, 22 in the main master cylinder M, the rocker arm 44 travels together with the bar 46 and the piston shaft 27, and such longitudinal movement is obtained by the depression of the pedal P. The pedal P is mounted on an operating lever 51 which is fixed to a pivoted shaft 52 which is supported on a fixed portion 53 of the chassis or frame of the vehicle (Fig. 2). An operating link 55 is also secured to the pivot pin 52 for rotation therewith so that as the lever 51 is moved by a manipulation of the pedal P, the pin or shaft 52 is turned for imparting movement to the operating link 55. The operating link 55 has an elongate opening 55a therethrough at its upper end into which extends a crank arm 57 which is secured to the rocker arm 44 at an intermediate point on the rocker arm 44. As the operating link 55 moves in an arcuate path at its upper end, it imparts longitudinal movement to the rocker arm 44 because of the fact that the crank arm 57 extends through the slot or opening 55a.

The longitudinal movement of the rocker arm 44 is transmitted to the bar or rod 46 and thus to the piston 21, 22 when the lug 47 is held in position within the recess 46a, but no movement is imparted to the pistons within the auxiliary master cylinder A. The rocker arm 44 does have a lug or projection 60 which is positioned on the opposite side of the rocker arm 44 from the lug 47. The lug 60 is normally held above a connecting bar or rod 61 (Figs. 4 and 5), except that the projection 60 has a downwardly extending guide tip 62 formed thereon which slides within a recess 61a in the bar or rod 61. However, it is to be noted that the lower end of the lug 60 does not extend into the recess 61a as indicated by the numeral 60a in Fig. 5. Therefore, during normal operation the projection 60 is above the recess 61a, but the tip 62 extends into the recess 61a. However, since the tip 62 is only formed at the rear portion of the projection 60, it does not contact any portion of the bar 61 for imparting longitudinal movement to such bar 61. When the pin 48 is released from the lug 47 (Fig. 7) the spring 43 applies a torque force to pivot the rocker arm 44 so that when the projection 60 is aligned with the length of the recess 61a, the entire projection 60 then is positioned in the recess 61a, and thereafter, longitudinal movement of the rocker arm 44 is transmitted to the pistons within the auxiliary master brake cylinder A instead of the cylinder M.

The mechanism D may take many forms, but as illustrated in Fig. 2 of the drawings, such mechanism D includes a reservoir or housing 70 which is closed except for the inlet opening from the fluid conductor 35 and the openings to the fluid conductors 14, 15, 16 and 17. The fluid which is used in the brake system fills the reservoir or housing 70. Valve seats 14a, 15a, 16a, and 17a are provided within the chamber or housing 70 at the openings for the fluid conductors 14, 15, 16, and 17, respectively. Normally fluid communication is established from the fluid conductor 35 to each of the fluid conductors 14, 15, 16 and 17 through the reservoir or housing 70. A ball valve 72 is held in position within the reservoir or chamber 70 against a stop 73 by a resilient member such as the spring 74. Preferably, the ball is not attached to either the stop 73 or the spring 74, and the stop 73 is fixed in position within the chamber or housing 70. So long as the fluid pressure within the housing 70 is equalized, which is the situation during normal operation when no leaks are present, the ball 72 is held firmly against the stop 73 by the spring 74. However, if a leak develops in any one of the fluid conductors 14, 15, 16, or 17, or any of the wheel brake cylinders W-1, W-2, W-3, or W-4, then a lateral force or fluid pressure is applied to the ball 72 which is violent enough to force the ball 72 to move away from the curved surface 73a of the stop 73 towards the valve seat adjacent the fluid conductor in which the leak is present. For example, assuming a leak develops in either the fluid conductor 17 or the wheel brake cylinder W-4 therewith, there would be a violent flow of fluid through the leak when the pedal P is depressed, whether the master cylinder M is being used or the auxiliary cylinder A is in use. Such movement of the fluid through the leak imparts a force to the ball 72 sufficient to move it to the dotted line position shown in Fig. 2 so that the ball 72 seats in the valve seat 17a to close the opening to the fluid conductor 17 from the chamber or housing 70. Thereafter, no further loss of the fluid in the brake system is caused, and it is possible to develop the necessary fluid pressure at the other wheel brake cylinders W-1, W-2, and W-3 to stop the movement of the wheels therewith for stopping the vehicle. Therefore, it can be seen that whether the leak develops in the master cylinder M or in one of the lines 14, 15, 16, 17 or in one of the wheel cylinders W-1, W-2, W-3 or W-4, the safety brake apparatus of this invention provides an automatic means for correcting the situation so that the movement of the vehicle can be stopped.

In the operation or use of the safety apparatus of this invention, the main master brake cylinder M is connected to the pedal P through the rocker arm 44, crank arm 57, link 55, pivot rod 52, operating lever 51 and the pedal P. The rocker arm 44 is of course maintained in connected relationship with the master cylinder M because of the locking pin 48 which extends into the opening 46f in the bar 46 and also into the opening 47a (Fig. 7) of the lug 47. The pedal P is the usual type of pedal which is present in an automobile or other vehicle and when it is depressed, the pistons 21, 22 in the main master cylinder M are moved to the left (as viewed in Fig. 3) to increase the fluid pressure within the brake system so as to operate the wheel cylinders W-1, W-2, W-3 and W-4 for stopping the movement of the wheels on the vehicle. Of course, it will be appreciated that the pedal P could be manually manipulated rather than with the foot, but in any event, the downward movement of the operating lever 51 causes the pressure fluid in the brake system to increase for stopping the vehicle, and a return of the lever 51 and the pedal P to a raised position releases such braking action by reducing the pressure fluid in the braking system. If for any reason the main master cylinder M becomes defective so that it cannot build up the necessary pressure fluid to stop the movement of the wheels of the vehicle, then the pistons 21, 22 will move to the left (as viewed in Fig. 3) a greater distance than they normally would move when the pressure fluid is properly developed. Such increase in the amount of movement of the pistons 21, 22 is utilized in this invention for removing the locking pin 48 from its holding or locking position with the lug 47. This is accomplished by making the wire or other flexible line 49 of approximately the same length as the normal length of the stroke of the pistons 21, 22 so that when the pistons 21, 22 have reached their normal full stroke for braking action, the line 49 would be substantially taut or straight. However, if there is a defect in the master cylinder M which permits the pistons 21, 22 to move beyond such normal braking position, then the line 49 would hold the locking pin 48 as the bar 46 moved to the left (Fig. 2) relative to the locking pin 48 so that the pin 48 would be pulled from the bar 46. When that occurs, the rocker arm 44 and the projection 60 would be in about the position illustrated in Fig. 6 of the drawings. The torsion spring 43 would be acting on the rocker arm 44 to turn same for urging the projection 60 into the recess 61a, but due to the fact that the projection 60 is forward of the recess 61a, it cannot enter such recess 61a until the pedal P is first released. Since the normal tendency for a driver of an automobile is to release the pedal P if the brakes do not react when the pedal is depressed, the automatic reaction of the operator or driver is to permit the pedal P to return to the released or non-braking position shown in Fig. 1 of the drawings. When the pedal P has reached that position, the operating lever 51 is also returned to its non-braking position so that the rocker arm 44 is pulled back for aligning the projection 60 with the recess 61a. Then, the torsion spring 43 turns the rocking arm 44 to position the projection 60 in the recess 61a as indicated in Fig. 6 (by dotted lines) and in Fig. 7 of the drawings. When the operator or driver then depresses the pedal P, the forward surface 60b of the projection 60 will engage with the forward wall of the recess 61a to cause the bar 61 and the piston shaft 127 to move forwardly for thereby operating the piston within the auxiliary master brake cylinder A. Since the lug 47 has moved out of the recess 46a, the piston in the main master cylinder M is not moved and therefore the main master cylinder M is inactive. The auxiliary master cylinder A will continue to operate in the brake system thereafter until such time as a defect occurs therein, and normally, the driver of the automobile will get the main master cylinder M repaired promptly so that the safety feature of the auxiliary brake will again be available. It can therefore be seen that the changing means C accomplishes an automatic shifting from the main master cylinder M to the auxiliary master cylinder A without requiring any special change by the operator or driver of the vehicle. The release of the pedal P to the non-braking position and the subsequent depression thereof is the only action required on the part of the operator to obtaining braking action when the master cylinder M has failed, and as pointed out, the releasing of the pedal P when the brakes fail to work is a natural reaction on the part of operators or drivers of vehicles, so that the change over to the auxiliary cylinder A is accomplished without even requiring any thought on the part of the driver.

The operator or driver of the vehicle will recognize that the master cylinder M has failed because of the fact that the pedal P will have gone down to the floor board 11 or beyond its normal amount when the master cylinder M failed. Also, there will be an indication to the operator or driver of the vehicle when one of the fluid conductors 14, 15, 16, or 17 develops a leak or when a leak develops in one of the wheel brake cylinders therewith because there will be an uneven braking action with only the three wheels being braked. Therefore, the operator or driver of the vehicle is given an indication by the safety brake apparatus of this invention when the defect occurs, but the defect does not prevent satisfactory operation of the apparatus for stopping movement of the vehicle.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A safety brake apparatus for use with a fluid operated brake system on a vehicle having wheels thereon wherein the brake system includes a first master brake cylinder and piston therein for creating fluid pressure in the system, a wheel brake cylinder and piston operable therein for each of said wheels, fluid conductors connecting said master brake cylinder with each wheel brake cylinder for transmitting said fluid pressure from said master brake cylinder to each of the wheel brake cylinders for operating same to thereby stop or retard the movement of the wheels, a pedal on said vehicle, and a connection means for connecting said pedal with said piston in said master cylinder for controlling the application of fluid pressure to the wheel cylinders, the improvement residing in, a second master cylinder and piston operable therein which is inactive while said piston in said first master brake cylinder is connected to said pedal, fluid conductor means connecting said second master cylinder to said wheel brake cylinders, urging means for moving said connection means from its connected position with said first master brake piston to a connected position with said second master brake piston and for disconnecting said pedal from the first master cylinder piston when such piston fails to create a predetermined fluid pressure in said brake system, retaining means for preventing said moving of said connection means from its connected position with said first master brake piston, and means for releasing said retaining means for thereby enabling said urging means to move said connection means for connecting the second master cylinder piston to said pedal for controlling the operation thereof and for supplying pressure fluid to said wheel brake cylinders after the first master cylinder piston is disconnected from said pedal.

2. The structure set forth in claim 1, wherein said means for releasing said retaining means includes means for limiting the movement of said retaining means upon a depression of said pedal beyond its normal amount.

3. The structure set forth in claim 1, wherein said connection means includes a rocker arm having a lug thereon, wherein said retaining means includes a releasable pin connecting said first master cylinder piston to said lug, and wherein said means for releasing said retaining means includes means for releasing said pin from its connection to said lug and said first master cylinder piston when said first master cylinder piston moves in its cylinder a predetermined distance which is greater than its normal distance of travel in its cylinder.

4. A safety brake apparatus for use with a fluid operated brake system on a vehicle having wheels thereon wherein the brake system includes a first master brake cylinder and piston therein for creating fluid pressure in the system, a wheel brake cylinder and piston operable therein for each of said wheels, fluid conductors connecting said master brake cylinder with each wheel brake cylinder for transmitting said fluid pressure from said master brake cylinder to each of the wheel brake cylinders for operating same to thereby stop or retard the movement of the wheels, and a pedal on said vehicle connected with said piston in said master cylinder for controlling the application of fluid pressure to the wheel cylinders, the improvement residing in, a second master cylinder and piston operable therein which is inactive while said piston in said first master brake cylinder is connected to said pedal, fluid conductor means connecting said second master cylinder to said wheel brake cylinders, means for disconnecting said pedal from the first master cylinder piston when such piston fails to create a predetermined fluid pressure in said brake system, means for connecting the second master cylinder piston to said pedal for controlling the operation thereof and for supplying pressure fluid to said wheel brake cylinders after the first master cylinder piston is disconnected from said pedal, a rocker arm having a lug thereon, a releasable pin connecting said first master cylinder piston to said lug, means connecting said pedal to said rocker arm for moving said rocker arm longitudinally to effect movement of the piston in said first master cylinder while said releasable pin maintains the connection between said lug and said piston, said means for disconnecting said pedal from said first master cylinder piston including means for releasing said pin from its connection to said lug and said first master cylinder piston when said first master cylinder piston moves in its cylinder a predetermined distance which is greater than its normal distance of travel in its cylinder, said means for connecting said second master cylinder piston to said pedal including a piston shaft, a second lug on said rocker arm adapted to be moved into a recess in said shaft, and a torque means for rocking said rocker arm to position said second lug in said recess for thereafter imparting longitudinal movement to said second master cylinder piston when said rocker arm is moved longitudinally.

References Cited in the file of this patent
UNITED STATES PATENTS

| | | |
|---|---|---|
| 2,299,932 | Scott | Oct. 27, 1942 |
| 2,829,497 | Yaratan | Apr. 8, 1958 |
| 2,854,016 | Margida | Sept. 30, 1958 |